Oct. 26, 1937.  W. A. BARNES  2,096,873
INSULATED CONTAINER CONSTRUCTION
Filed Oct. 2, 1935
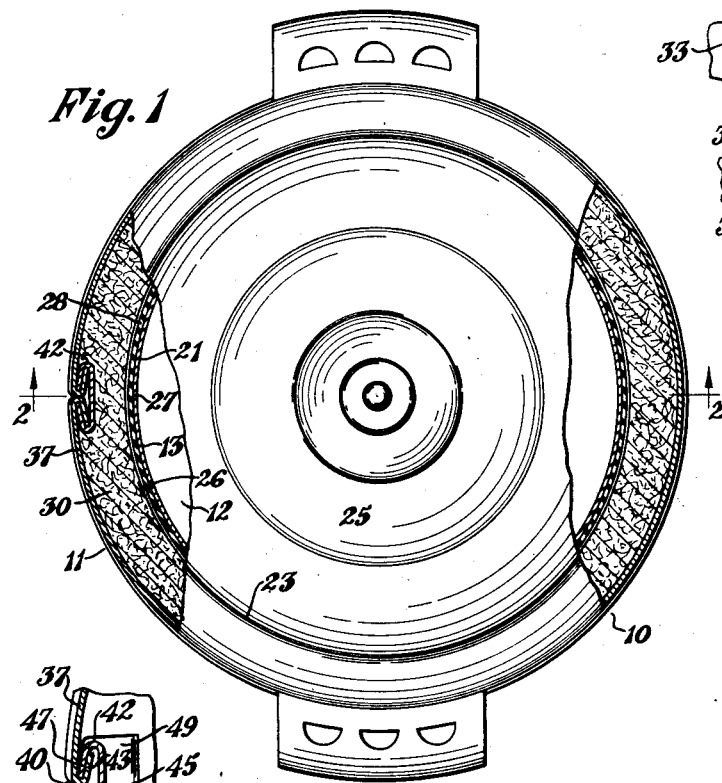
Fig.1
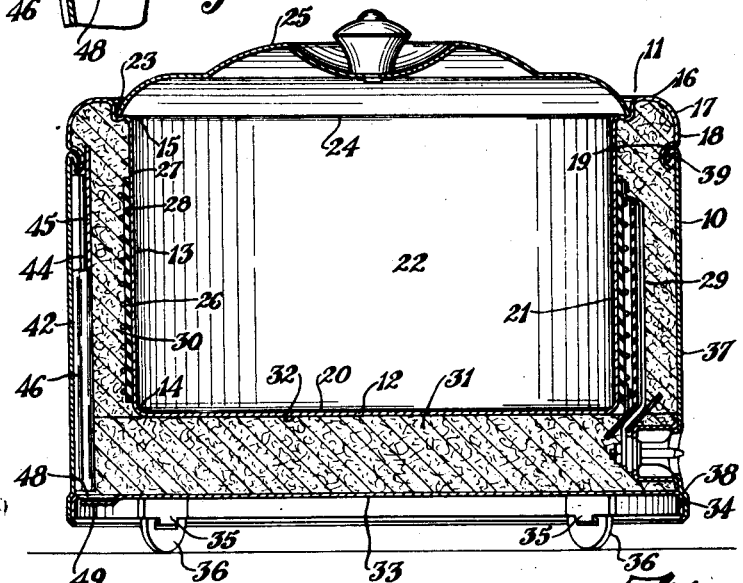
Fig.3
Fig.2
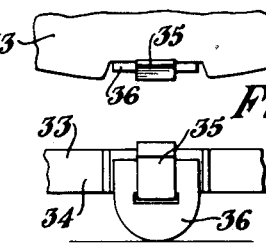
Fig.4
Fig.5
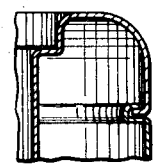
Fig.6
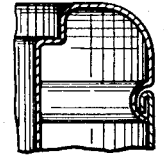
Fig.7
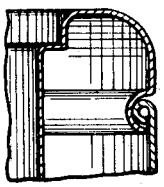
Fig.8
Fig.9
Inventor
W. A. Barnes
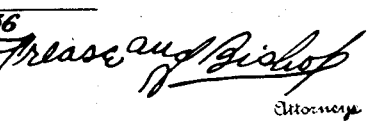
By Pease and Bishop
Attorneys Patented Oct. 26, 1937

2,096,873

UNITED STATES PATENT OFFICE 2,096,873

INSULATED CONTAINER CONSTRUCTION

William A. Barnes, Mansfield, Ohio

Application October 2, 1935, Serial No. 43,211

16 Claims. (Cl. 219—44)

The invention relates to insulated container construction more particularly adapted for use in an electrically heated casserole which includes a cooking well or compartment having a bottom wall, tubular side walls having one end connecting with the periphery of the bottom wall and having an annular flange wall extending outwardly from the other end, a base plate spaced from the bottom of the well bottom wall and a tubular casing extending between the outer periphery of the flange and the outer periphery of the base plate, and being spaced from the tubular wall of the well.

The cup-like insulating compartment thus formed between the well and the base plate and the casing has located therein, in the case of an electrically heated casserole, a heating element which usually extends about the outer face of the tubular well wall and the cup-shaped compartment is usually filled with insulation material, usually in the form of mineral wool.

In the manufacture of usual electrically heated casseroles of the above general type, the outer casing is located in place about the tubular well wall, and the usual mineral wool insulating material is stuffed into the space between the heating element and the outer casing resulting in uneven packing and crushing of the wool fibers, either of which results in less efficient heat insulation. At the same time the operation of inserting mineral wool consumes a relatively long period of time and is thus relatively expensive.

Moreover, in usual electrically heated casserole construction, the usual fiber feet are secured to the bottom or base with screws or rivets which are relatively costly to apply. Usual electrically heated casserole construction also includes conducting metal connections in the insulating compartment to hold the parts together, which reduces the efficiency of the insulation.

In some forms of usual electrically heated casserole construction there is excessive conduction of heat from the well to the outer casing.

The objects of the present invention include in general the provision of an improved insulated container construction, particularly adapted for use in an electrically heated casserole, and which has a simplified construction and arrangement of parts permitting economies in the manufacture thereof.

More particular objects of the present invention include the provision of an insulated container construction adapted for the application of insulation material in a manner so as to attain efficient insulation and without requiring stuffing or other operations likely to unevenly pack or crush the wool fibers of the preferred mineral wool insulation material.

Further particular objects of the present invention include the provision of an improved insulation container construction permitting the finishing of the several parts thereof to be carried out in the best manner suited to every part, and permitting the assembly of the entire container including its feet without the use of screws or rivets.

The foregoing and other objects are attained by the insulated container construction, apparatus, parts, improvements, combinations, and sub-combinations, which comprise the present invention, and the nature of which is set forth in the following general statement, and preferred embodiments of which, together with their mode of use are set forth in the following description, and which are particularly and distinctly pointed out and set forth in the appended claims forming part hereof.

The nature of the improvements of the present invention may be described in general terms as including insulated container construction particularly adapted for use in an electrically heated casserole and including a well having a bottom wall, a tubular wall connected at one end with the periphery of the bottom wall, a flange wall extending radially outwardly from the periphery of the other end of the tubular wall, the inner face of the well tubular wall and the inner face of the well bottom wall forming a container well compartment, an electric heating element around the outer face of the well tubular wall in the case of an electrically heated casserole, insulation material applied about the electric heating element and the outer face of the well tubular wall and upon the outer face of the well bottom wall, a base plate spaced from the well bottom wall, and a tubular casing applied about the insulation material, the well flange wall, and the base plate, the casing preferably comprising a band wrapped around the insulation material and the peripheries of the well flange and the base plate and having upper and lower ends formed and interfitting and engaging with preferably formed portions on the well flange and the base plate.

The preferable wrap-around band casing has adjacent side edges which are preferably secured to each other to complete the assembly of the casserole by hook flange and removable flanged channel means.

The insulation material is preferably in the form of pre-formed bats or pads of mineral wool.

The base plate preferably has fiber feet interfitting with portions of the base plate and being retained thereon by lower portions of the wrapped around casing.

By way of example, several embodiments of the present improvements are illustrated in the accompanying drawing forming part hereof, in which Figure 1 is a top plan view with portions broken away and illustrated in section of an electrically heated casserole including the present improved insulated container construction;

Fig. 2, a transverse sectional view thereof as on line 2—2, Fig. 1;

Fig. 3, an enlarged fragmentary view similar to Fig. 1, of a portion of the casserole, showing the preferred means of connecting the sides of the outer casing band by means of an interlocking channel retained in place by a tongue on the base plate of the casserole;

Fig. 4, a detached fragmentary top plan view of the base plate of the casserole illustrating the interfitting connection of one of the feet of the casserole;

Fig. 5, a fragmentary elevation view thereof;

Fig. 6, a fragmentary sectional view thereof after the application of the outer casing;

Fig. 7, Fig. 8, and Fig. 9, fragmentary transverse sectional views illustrating several modified forms for the interfitting and engaging connection of the outer casing of the casserole with the upper flange of the casserole well.

Similar numerals refer to similar parts throughout the drawing.

One embodiment of the present improved insulated container construction is illustrated in and by Figs. 1 to 6 inclusive, and is shown in the form of an electrically heated casserole, indicated generally by 10, and including a preferably one-piece well indicated generally by 11, having a circular bottom wall 12, a cylindric tubular wall 13 connected at its lower end at 14 with the periphery of the bottom wall 12.

The upper end of the tubular well wall 13 is connected at 15 with the inner periphery of an annular flange wall 16 which extends radially outwardly from the tubular well wall 13, and in the illustrated embodiment also is provided with an outer annular shoulder 17 which terminates in a band portion 18 radially spaced from the tubular well wall 13 and preferably provided with a connector bead flange or groove 19.

The inner face 20 of the well bottom wall 12 and the inner face 21 of the well tubular wall 13 form the upwardly opening container casserole or cooking compartment 22. Immediately adjacent the upper end of the tubular well wall 13 as illustrated the flange wall 16 has formed therein an upwardly opening cover supporting annular shouldered groove 23 which is adapted to support the peripheral edge 24 of a cover 25.

The casserole 10 furthermore includes an electric resistance heating element indicated generally by 26 which is wrapped around the major portion of the outer face 27 of the tubular well wall 13 and which is insulated therefrom as by insulation 28.

The heating element 26 is provided with suitably insulated connector means indicated generally by 29 for connecting the same with a source of electric power which may be a usual household power supply line.

There is wrapped about the heating element 26 and the outer face 27 of the well wall 13 insulation material indicated generally by 30, and which according to the present improvements consists of pre-formed bats or pads preferably made of mineral wool which is applied about the heating element 26 and the well wall 13 before the remaining parts of the casserole about to be described are assembled thereon.

There is also applied insulation material indicated generally by 31 upon the bottom face 32 of the well bottom wall 20 and across the lower ends of the tubular insulating material 31 for the well wall.

The bottom insulating material 31 is likewise according to the present improvements in the form of a pre-formed bat or pad, preferably of mineral wool.

The casserole 10 furthermore includes as illustrated a circular base plate 33 having a downwardly extending peripheral flange 34.

The flange 34 of the base plate 33 is provided with a plurality of U-tongues 35 each interfitting with a slot in a fiber foot 36 as best shown in Figs. 4, 5, and 6.

The casserole 10 furthermore includes an outer tubular casing indicated generally by 37 which interfits and engages at its lower end as by an inwardly opening annular groove 38 with the periphery and flange 34 of the base plate 33, and the tubular casing 37 interfits and engages as by an inwardly bent bead or tongue 39 with the outwardly opening groove of the groove bead 19 of the flange wall 16.

For the purposes of the present improvements, the tubular casing 37 is preferably in the form of a band having adjacent and preferably abutting side edges 40 and 41 which are preferably releasably connected with each other by means indicated generally by 42, but which may be connected by a press seaming operation.

In any event, the tubular band casing 37 in the assembly of the casserole 10 is wrapped around the tubular insulating material 30 and the interfitting and engaging peripheral portions of the base plate 33 and the flange wall 16.

In the preferred structure illustrated, the connecting means 42 for the adjacent edges 40 and 41 of the band casing 37 includes reversely directed flanges 43 and 44 extending as shown inwardly and reversely from each other from the edges 40 and 41.

The reversely directed or hook flanges 43 and 44 are connected with each other as shown by a locking channel 45 having longitudinally extending side edge flanges 46 and 47 inturned toward each other.

The locking channel is applied to the hook flanges of the band casing by longitudinally sliding the flanges of the locking channel in hook engagement with the hook flanges of the band casing, and as illustrated this is accomplished by providing an aperture 48 adjacent one edge of the base plate 30 through which the locking channel 45 may be inserted.

The aperture 48 is preferably provided as illustrated with a lock tongue 49 adapted for movement into and out of position permitting lengthwise movement of the lock channel on the band flanges.

When the band casing 37 is assembled on the complete casserole 10, as best shown in Figs. 2 and 6, the lower grooved end of the band casing 37 extends about and retains the feet 36 on the interfitting tongues 35 of the base plate 33.

Figs. 7, 8, and 9 show several modified forms of interfitting and engaging connection for the upper end of the casing of the improved container construction with the well flange wall thereof.

In the casserole 10 as illustrated the tubular well wall 13 and the tubular casing 37 are cylindric; and the annular flange wall 16, the well bottom wall 12, and the base plate 33 are circular.

It is obvious that the benefits of the improvements may be attained when the parts shown as cylindric and circular have oval or other desired forms.

I claim:

1. Insulated container construction including a well having a bottom wall, a tubular wall connected at one end with the periphery of the bottom wall, a flange wall extending radially outwardly from the periphery of the other end of the tubular wall, the inner face of the well tubular wall and the inner face of the well bottom wall forming the container well compartment, insulation material applied about the outer face of the well tubular wall and upon the outer face of the well bottom wall, a base plate spaced from the well bottom wall and a tubular casing wrapped about the insulation material for the well tubular wall, the tubular casing including a band extending around the insulation material and from the periphery of the well flange to the periphery of the base plate, the band having side edges extending between the base plate and the well flange, reversely directed flanges on the band side edges and a locking strip having longitudinally extending side edge flanges inturned towards each other and engaging the reversely turned flanges of the band side edges.

2. Insulated container construction including a well having a bottom wall, a tubular wall connected at one end with the periphery of the bottom wall, a flange wall extending radially outwardly from the periphery of the other end of the tubular wall, the inner face of the well tubular wall and the inner face of the well bottom wall forming the container well compartment, prefelted pads of insulation material applied about the outer face of the well tubular wall and upon the outer face of the well bottom wall, a base plate spaced from the well bottom wall and a tubular casing wrapped about the insulation material for the well tubular wall, the tubular casing including a band extending around the insulation material and from the periphery of the well flange to the periphery of the base plate, the band having side edges extending between the base plate and the well flange, reversely directed flanges on the band side edges and a locking strip having longitudinally extending side edge flanges inturned towards each other and engaging the reversely turned flanges of the band side edges.

3. Insulated container construction including a well having a bottom wall, a tubular wall connected at one end with the periphery of the bottom wall, a flange wall extending radially outwardly from the periphery of the other end of the tubular wall, the inner face of the well tubular wall and the inner face of the well bottom wall forming the container well compartment, prefelted pads of insulation material applied about the outer face of the well tubular wall and upon the outer face of the well bottom wall, a base plate spaced from the well bottom wall and a tubular casing wrapped about the insulation material for the well tubular wall, the tubular casing including a band extending around the insulation material and from the periphery of the well flange to the periphery of the base plate, the band having side edges extending between the base plate and the well flange, reversely directed flanges on the band side edges and a locking strip having longitudinally extending side edge flanges inturned toward each other and engaging the reversely turned flanges of the band side edges, the locking strip being movable lengthwise of the engaged flanges of the band side edges.

4. Insulated container construction including a well having a bottom wall, a tubular wall connected at one end with the periphery of the bottom wall, a flange wall extending radially outwardly from the periphery of the other end of the tubular wall, the inner face of the well tubular wall and the inner face of the well bottom wall forming the container well compartment, prefelted pads of insulation material applied about the outer face of the well tubular wall and upon the outer face of the well bottom wall, a base plate spaced from the well bottom wall and a tubular casing wrapped about the insulation material for the well tubular wall, the tubular casing including a band extending around the insulation material and from the periphery of the well flange to the periphery of the base plate, the band having side edges extending between the base plate and the well flange, reversely directed flanges on the band side edges and a locking strip having longitudinally extending side edge flanges inturned towards each other and engaging the reversely turned flanges of the band side edges, an aperture in the base plate opposite the band side edges through which the locking strip is driven into place and means to close the aperture to prevent displacement of the locking strip.

5. Insulated container construction including a well having a bottom wall, a tubular wall connected at one end with the periphery of the bottom wall, a flange wall extending radially outwardly from the periphery of the other end of the tubular wall, the inner face of the well tubular wall and the inner face of the well bottom wall forming the container well compartment, insulation material applied about the outer face of the well tubular wall and upon the outer face of the well bottom wall, a base plate spaced from the well bottom wall, and a tubular casing wrapped about the insulation material for the well tubular wall and about the peripheries of the well flange and the base plate, the casing having formed portions interfitting and engaging at one end with the periphery of the well flange and interfitting and engaging at the other end with the periphery of the base plate, the tubular casing including a band extending around the insulation material and the peripheries of the well flange and the base plate, the band having adjacent side edges extending between the well flange and the base plate, and means securing the side edges of the band to each other.

6. Insulated container construction including a well having a bottom wall, a tubular wall connected at one end with the periphery of the bottom wall, a flange wall extending radially outwardly from the periphery of the other end of the tubular wall, the inner face of the well tubular wall and the inner face of the well bottom wall forming the container well compartment, insulation material applied about the outer face of the well tubular wall and upon the outer face of the well bottom wall, a base plate spaced from the well bottom wall, and a tubular casing wrapped about the insulation material for the well tubular wall and about the peripheries of the well flange and the base plate, the casing having formed portions interfitting and engaging at one end with the periphery of the well flange and interfitting and engaging at the other end with the periphery of the base plate, the tubular casing including a band extending around the insulation material and the peripheries of the well flange and the base plate, the band having adjacent side edges extending between the well flange and the base plate, and means inserted through an aperture in the base plate securing the side edges of the band to each other.

7. Insulated container construction including a well having a bottom wall, a tubular wall connected at one end with the periphery of the bottom wall, a flange wall extending radially outwardly from the periphery of the other end of the tubular wall, the inner face of the well tubular wall and the inner face of the well bottom wall forming the container well compartment, insulation material applied about the outer face of the well tubular wall and upon the outer face of the well bottom wall, a base plate spaced from the well bottom wall, and a tubular casing wrapped about the insulation material for the well tubular wall and about the peripheries of the well flange and the base plate, the casing having formed portions bead interfitting and engaging at one end with the periphery of the well flange and interfitting and engaging at the other end with the periphery of the base plate.

8. Insulated container construction including a well having a bottom wall, a tubular wall connected at one end with the periphery of the bottom wall, a flange wall extending radially outwardly from the periphery of the other end of the tubular wall, the inner face of the well tubular wall and the inner face of the well bottom wall forming the container well compartment, insulation material applied about the outer face of the well tubular wall and upon the outer face of the well bottom wall, a base plate spaced from the well bottom wall, and a tubular casing wrapped about the insulation material for well tubular wall and about the peripheries of the well flange and the base plate, the casing having formed portions interfitting and engaging at one end with the periphery of the well flange and groove interfitting and engaging at the other end with the periphery of the base plate.

9. Insulated container construction including a well having a bottom wall, a tubular wall connected at one end with the periphery of the bottom wall, a flange wall extending radially outwardly from the periphery of the other end of the tubular wall, the inner face of the well tubular wall and the inner face of the well bottom wall forming the container well compartment, insulation material applied about the outer face of the well tubular wall and upon the outer face of the well bottom wall, a base plate spaced from the well bottom wall, and a tubular casing wrapped about the insulation material for the well tubular wall and about the peripheries of the well flange and the base plate, the casing having formed portions bead interfitting and engaging at one end with the periphery of the well flange and groove interfitting and engaging at the other end with the periphery of the base plate.

10. Insulated container construction including a well having a bottom wall, a tubular wall connected at one end with the periphery of the bottom wall, a flange wall extending radially outwardly from the periphery of the other end of the tubular wall, the inner face of the well tubular wall and the inner face of the well bottom wall forming the container well compartment, insulation material applied about the outer face of the well tubular wall and upon the outer face of the well bottom wall, a base plate spaced from the well bottom wall, feet interfitting with portions of the base plate, and a tubular casing applied about the insulation material for the well tubular wall, the casing interfitting and engaging at one end with the periphery of the well flange and interfitting and engaging at the other end with the periphery of the base plate, and the casing extending about and retaining the feet on the base plate.

11. Insulated container construction including a well having a bottom wall, a tubular wall connected at one end with the periphery of the bottom wall, a flange wall extending radially outwardly from the periphery of the other end of the tubular wall, the inner face of the well tubular wall and the inner face of the well bottom wall forming the container well compartment, insulation material applied about the outer face of the well tubular wall and upon the outer face of the well bottom wall, a base plate spaced from the well bottom wall, and a tubular casing applied about the insulation material for the well tubular wall, the casing interfitting and engaging at one end with the periphery of the well flange and interfitting and engaging at the other end with the periphery of the base plate, the tubular casing including a band extending around the insulation material and the peripheries of the well flange and the base plate, the band having adjacent side edges extending between the well flange and the base plate, reversely directed flanges on the adjacent band side edges, and a lock channel having longitudinally extending side edge flanges inturned towards each other and engaging the reversely turned flanges of the band.

12. Insulated container construction including a well having a bottom wall, a tubular wall connected at one end with the periphery of the bottom wall, a flange wall extending radially outwardly from the periphery of the other end of the tubular wall, the inner face of the well tubular wall and the inner face of the well bottom wall forming the container well compartment, insulation material applied about the outer face of the well tubular wall and upon the outer face of the well bottom wall, a base plate spaced from the well bottom wall, and a tubular casing applied about the insulation material for the well tubular wall, the casing interfitting and engaging at one end with the periphery of the well flange and interfitting and engaging at the other end with the periphery of the base plate, the tubular casing including a band extending around the insulation material and the peripheries of the well flange and the base plate, the band having adjacent side edges extending between the well flange and the base plate, reversely directed flanges on the adjacent band side edges, and a lock channel having longitudinally extending side edge flanges inturned towards each other and engaging the reversely turned flanges of the band, the lock channel and its flanges being movable lengthwise of the engaged flanges of the band side edges, and a lock tongue on the base plate adapted for movement into and out of position permitting lengthwise movement of the lock channel on the band flanges.

13. Insulated container construction including a well having a bottom wall, a tubular wall connected at one end with the periphery of the bottom wall, a flange wall extending radially outwardly from the periphery of the other end of the tubular wall, the inner face of the well tubular wall and the inner face of the well bottom wall forming the container well compartment, an electric heating element around the outer face of the well tubular wall, insulation material applied about the electric heating element and the outer face of the well tubular wall and upon the outer face of the well bottom wall, a base plate spaced from the well bottom wall, and a tubular casing wrapped about the insulation material for the well tubular wall, the casing having formed portions engaging at one end with the periphery of the well flange and engaging at the other end with the periphery of the base plate, the tubular casing having a seam extending from the periphery of the well flange to the periphery of the base plate, said seam having reversely turned edges and a locking strip with inturned longitudinal edge flanges engaging the reversely turned edges of the seam.

14. Insulated container construction including a well having a bottom wall, a tubular wall connected at one end with the periphery of the bottom wall, a flange wall extending radially outwardly from the periphery of the other end of the tubular wall, the inner face of the well tubular wall and the inner face of the well bottom wall forming the container well compartment, an electric heating element around the outer face of the well tubular wall, pre-formed insulation material applied about the electric heating element and the outer face of the well tubular wall and upon the outer face of the well bottom wall, a base plate spaced from the well bottom wall, and a tubular casing wrapped about the insulation material for the well tubular wall, the casing having formed portions engaging at one end with the periphery of the well flange and engaging at the other end with the periphery of the base plate, the tubular casing having a seam extending from the periphery of the well flange to the periphery of the base plate, said seam having reversely turned edges and a locking strip with inturned longitudinal edge flanges engaging the reversely turned edges of the seam.

15. Insulated container construction including a well having a bottom wall, a tubular wall connected at one end with the periphery of the bottom wall, a flange wall extending radially outwardly from the periphery of the other end of the tubular wall, the inner face of the well tubular wall and the inner face of the well bottom wall forming the container well compartment, an electric heating element around the outer face of the well tubular wall, pre-felted pads of insulation material applied about the electric heating element and the outer face of the well tubular wall and upon the outer face of the well bottom wall, a base plate spaced from the well bottom wall, and a tubular casing wrapped about the insulation material for the well tubular wall and about the peripheries of the well flange and the base plate, the casing having formed portions interfitting and engaging at one end with the periphery of the well flange and interfitting and engaging at the other end with the periphery of the base plate.

16. Insulated container construction including a well having a bottom wall, a tubular wall connected at one end with the periphery of the bottom wall, a flange wall extending radially outwardly from the periphery of the other end of the tubular wall, the inner face of the well tubular wall and the inner face of the well bottom wall forming the container well compartment, insulation material applied about the outer face of the well tubular wall and upon the outer face of the well bottom wall, a base plate spaced from the well bottom wall, the base plate having a flanged periphery, and a tubular casing wrapped about the insulation material for the well tubular wall and about the peripheries of the well flange and the base plate, the casing having formed portions interfitting and engaging at one end with the periphery of the well flange and interfitting and engaging at the other end with the flanged periphery of the base plate.

WILLIAM A. BARNES.